United States Patent [19]

Wilbur

[11] 4,100,391
[45] Jul. 11, 1978

[54] PORTABLE SEAM WELDER

[75] Inventor: William T. Wilbur, New Baltimore, Mich.

[73] Assignee: Progressive Machinery Corporation, Pontiac, Mich.

[21] Appl. No.: 722,349

[22] Filed: Sep. 13, 1976

[51] Int. Cl.² .............................................. B23K 11/06
[52] U.S. Cl. ...................................... 219/81; 219/82; 219/84; 219/90
[58] Field of Search ....................... 219/82, 81, 84, 90

[56] References Cited

U.S. PATENT DOCUMENTS

| 1,052,490 | 2/1913 | Linden | 219/82 |
| 2,206,549 | 7/1940 | McIntosh | 219/82 |
| 2,730,600 | 1/1956 | Fisher | 219/84 |
| 3,250,890 | 5/1966 | Denis | 219/82 |
| 3,546,416 | 12/1970 | Roseta | 219/81 |
| 3,597,571 | 8/1971 | McGill | 219/81 |

FOREIGN PATENT DOCUMENTS 1,962,543  12/1969  Fed. Rep. of Germany ......... 219/90

Primary Examiner—E. A. Goldberg
Attorney, Agent, or Firm—Barnes, Kisselle, Raisch & Choate

[57] ABSTRACT

A portable seam welder comprising a pair of arms pivoted to one another about a pivot axis and a spindle assembly mounted on each arm. Each spindle assembly includes a shaft rotatably mounted about an axis extending generally parallel to the pivot axis and perpendicular to the longitudinal axis of the arm. A welding wheel is mounted on each shaft. At least one of the wheels is driven to rotate it. Handles are mounted on one of the arms for manipulating the welder, and an actuator means extending between the arms for pivoting the arms relative to one another for moving said wheels toward and away from one another.

17 Claims, 4 Drawing Figures ns
PORTABLE SEAM WELDER

This invention relates to portable seam welders.

BACKGROUND OF THE INVENTION

In the manufacture of various items such as automobile bodies, it is common to utilize portable seam welders along a production line to weld various parts on the body. One commonly used type of portable seam welder comprises welding wheels mounted on shafts which extend generally along the longitudinal axis of the arms which are pivoted to one another. One of the problems with respect to such welders is that because of the size and construction, they are difficult to handle. In addition, radial roller bearings are used as load carrying members as well as electrical contact members; this results in a relatively low contact area and burning of the contact rollers on the opposite side of spindle pressure which reduces the life of said bearings and the amount of current flowing to the weld wheels. Further because of the difficulty of providing enough current, they operate at low speed and commonly provide longitudinally spaced spot welds rather than a continuous seam weld.

Although large high capacity stationary welders have been known, as far as I am aware, no portable welders have been developed which provide a continuous seam of any reasonable duration in a portable seam welder.

In addition, it is difficult to adjust the rolls angularly with respect to one another to provide clearance for various product configurations.

Accordingly, among the objects of the invention are to provide a portable seam welder which can be readily handled, which produces a continuous seam weld, which is readily adjustable, which can be changed from right to left hand use, which produces a uniform speed of weld; and wherein either one or both of the rollers may be driven and in which the current carrying collector ring assembly is separate from the spindle radial and thrust support bearings.

SUMMARY OF THE INVENTION

In accordance with the invention, the portable seam welder embodying the invention comprises a pair of arms pivoted to one another about a pivot axis, a roller bearing collector ring and spindle assembly mounted on each arm wherein each spindle assembly includes a shaft rotatably mounted about an axis extending generally parallel to the pivot axis and at a right angle to the longitudinal axis of the arm. A welding wheel is provided on each shaft and means are mounted on at least one or both of the arms for rotating the wheels. Weld wheels can either be gear or knurl driven. Handles are provided on the stationary arm for manipulating said welder, and an actuator extending between the arms for pivoting said arms relative to one another for moving said wheel toward and away from one another.

DESCRIPTION OF THE DRAWINGS

FIG. 4 is a sectional view taken along the line 4—4 in FIG. 1.

DESCRIPTION

Figure 1:
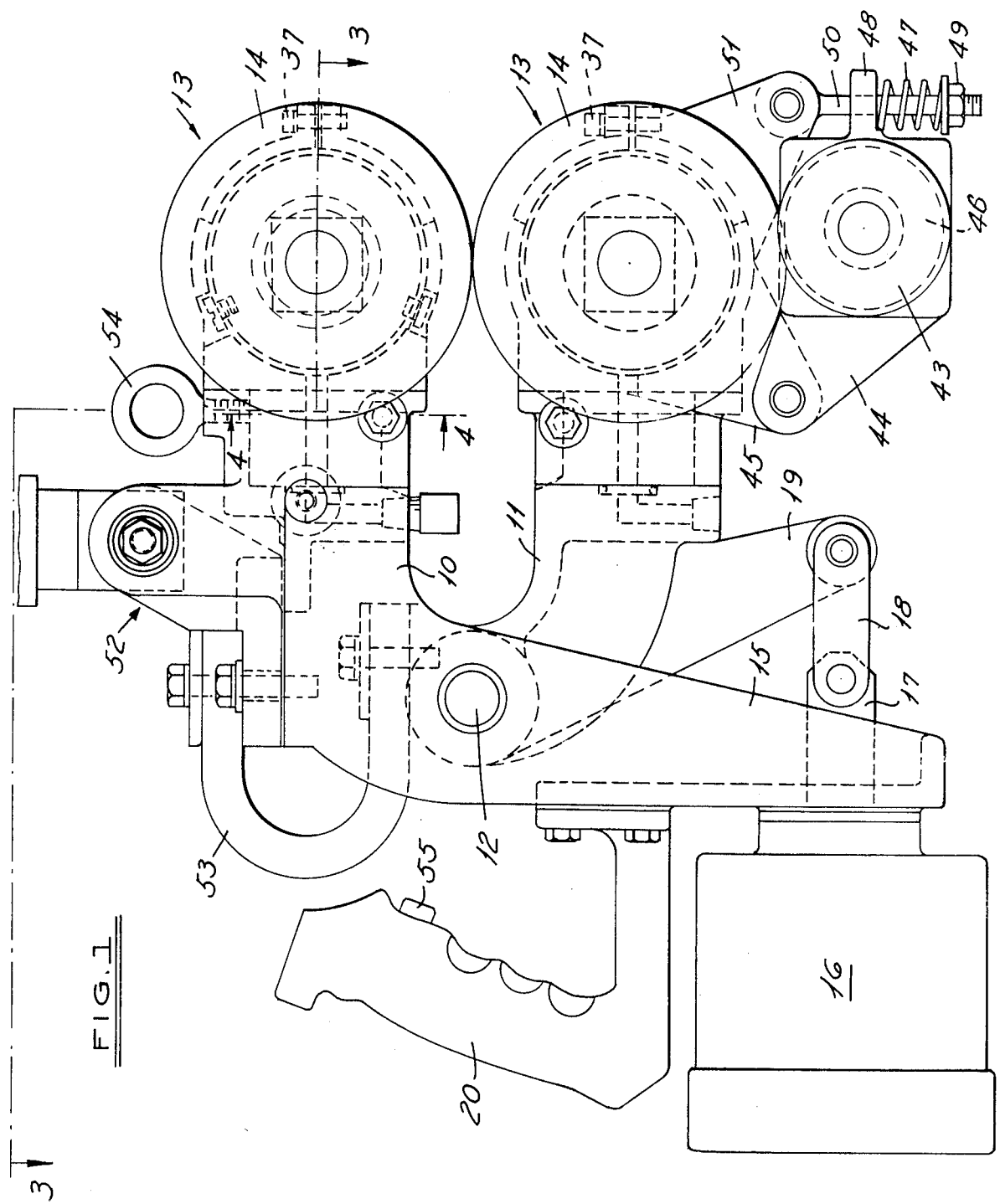
FIG. 1 is a side elevational view of a portable seam welder embodying the invention.

Referring to FIG. 1, the portable seam welder embodying the invention is adapted to be suspended in a counterbalanced manner, well known in the art, in a production facility such as a production line for automobiles. The portable seam welder comprises arms 10, 11 which are pivoted to one another on a shaft 12 that is at a right angle to the axis of the arms 10, 11. Spindle assemblies 13 are mounted on the ends of the arms, as presently described, to rotatably support welding wheels 14 with their axes generally parallel to the pivot axis 12 and at a right angle to the longitudinal axes of the arms 10, 11.

Arm 10 includes an extension 15 that supports a piston cylinder actuator 16 which has its shaft 17 connected by a link 18 to an extension 19 on the arm 11. Actuation of actuator 16 brings the rollers 13 toward and away from one another.

Figure 3:
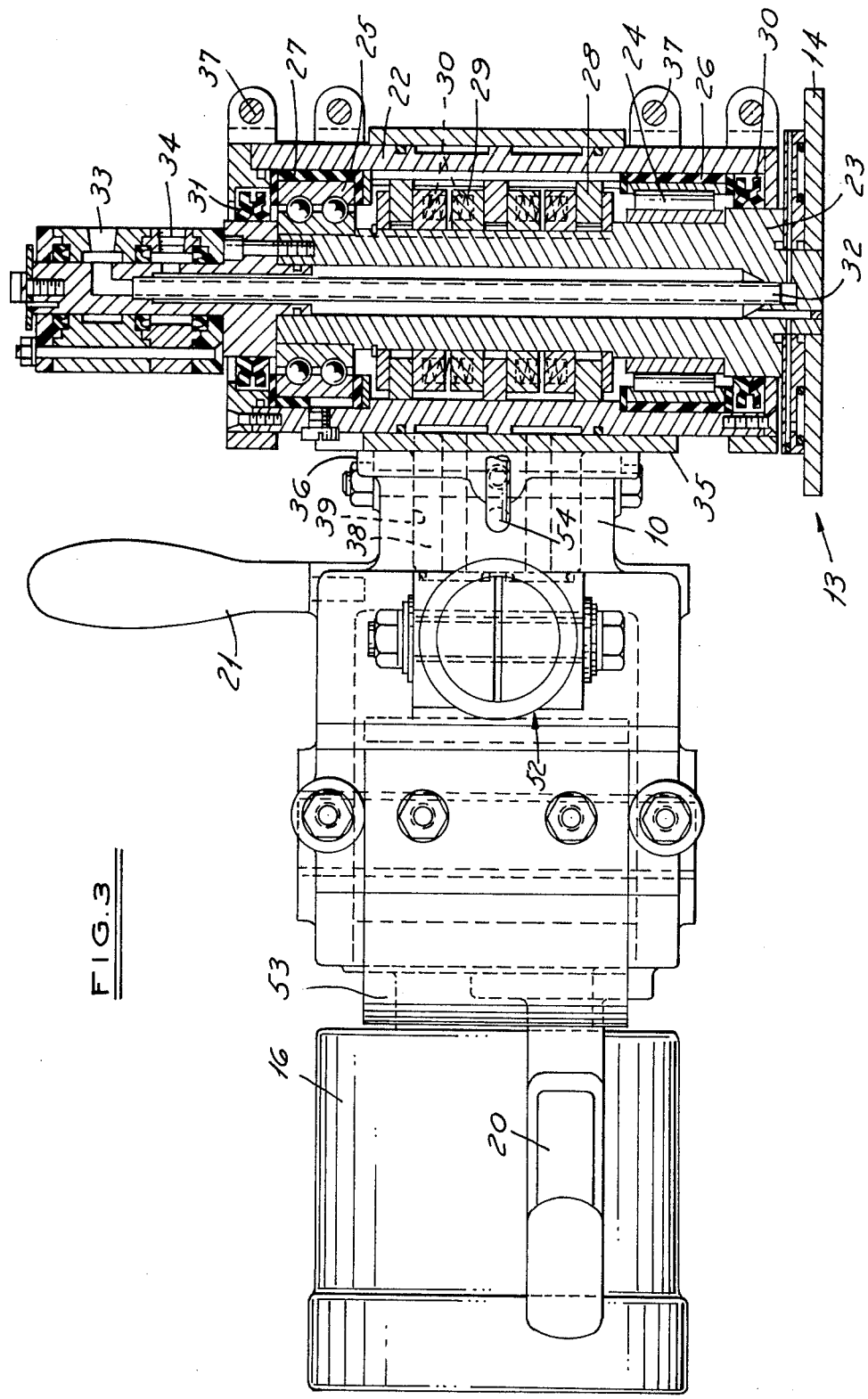
FIG. 3 is a sectional view taken along the line 3—3 in FIG. 1.

In order to readily handle the portable seam welder, a grip type handle 20 is provided on the extension 15 of the arm 10, that extends generally at a right angle to arm 10, and a laterally extending handle 21 is provided on the arm 10 (FIG. 3).

Figure 2:
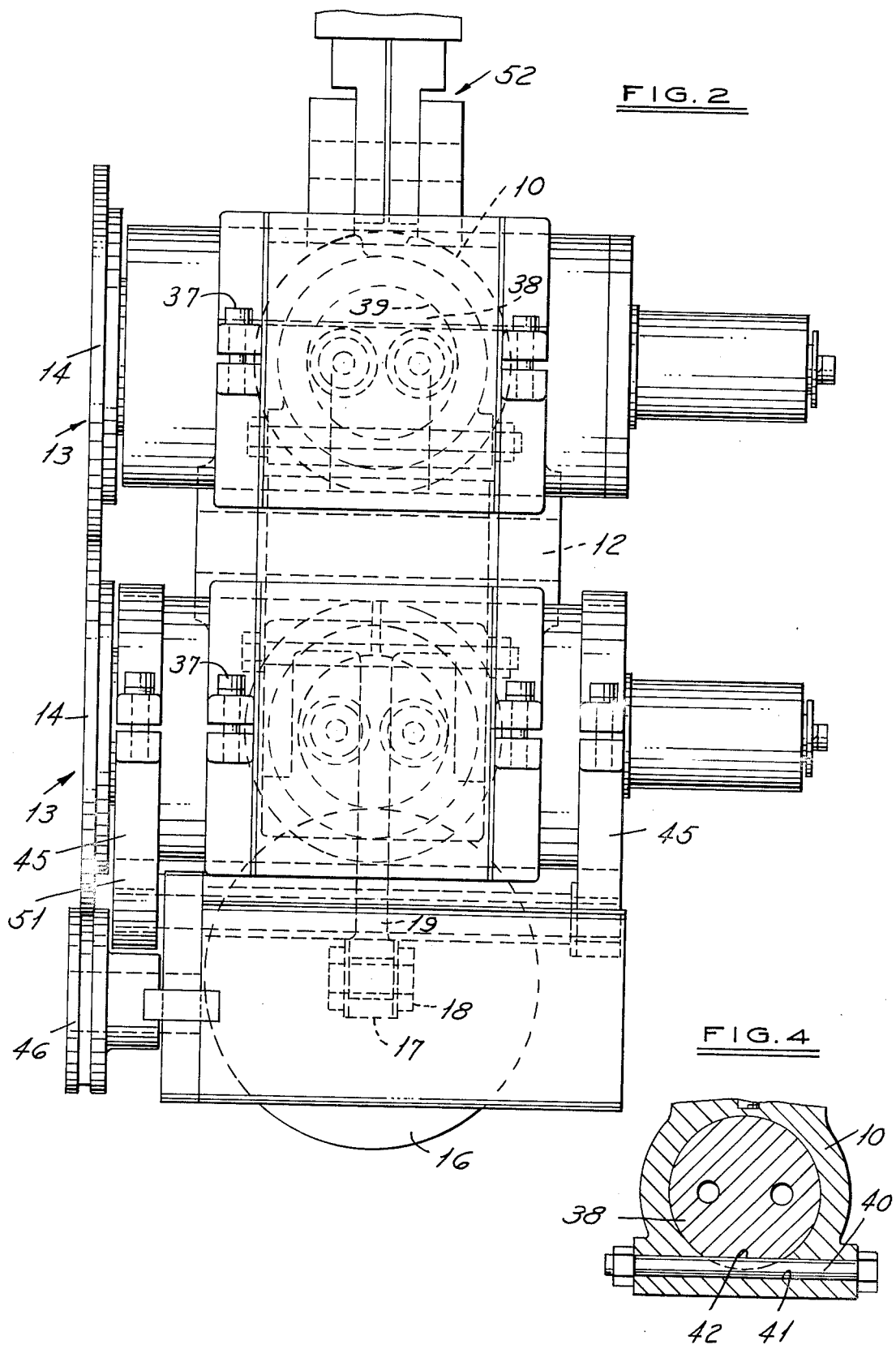
FIG. 2 is an end elevational view.

Referring to FIGS. 2 and 3, each spindle assembly 13 comprises a cylindrical housing 22 in which a shaft 23 is rotatably supported by bearings 24, 25. Insulators 26, 27 electrically isolate the bearings 24, 25 from the housing 22. An electrical circuit is completed from the housing 22 to the shaft 23 on which weld wheel 14 is mounted by a first set of generally annular split collector ring contacts 28 which are fixed against rotational movement on the housing 22 and a second set of annular split collector ring contacts 29 which are fixed by a key and keyway so that they rotate with shaft 23. Springs 30 urge the contacts 29 axially into engagement with the contacts 28 to provide a good electrical circuit. By having a plurality of contacts 28, 29 sufficient power is insured to produce a continuous seam. Thus, the current carrying members are independent of load carrying bearings and bearing adjustment is not required.

The spindle assembly 13 further includes end seals 31 which isolate the interior of the spindle and permit lubrication and cooling thereof. Additional means for cooling the shaft include a drilled hole in shaft 23 and a tube 32 extending axially to which cooling fluid can be introduced from an inlet 34 passing through the shaft hole to the tube 32 and to an outlet 33.

As further shown in FIG. 3, each spindle assembly 13 is telescoped within a generally tubular portion 35 of a head 36 on its respective arm 10. Each spindle assembly is clamped in its telescoped axial position relative to portion 35 by nut and bolt assemblies 37 (FIG. 1).

Each head 36 includes a second portion 38 telescoped within an opening 39 in the arm and thereby the head and in turn the spindle assembly 13 is adjusted in particular angular relation with respect to the axis of its respective arm. The head is locked in the particular angular position as shown in FIG. 4 by a bolt 40 that extends through an opening 41 in the arm and through a groove 42 in the tubular portion 38 of the head. In practice, if it is desired to change the angular position of the spindle assembly with respect to the arm, the bolt 40 is removed, the head is rotated to the new angular relationship and a new slot 42 is drilled so that the bolt 40 will lock the head in the new angular position when it is reinserted.

The mounting of each spindle assembly 13 within its respective tubular portion 35 is such that the spindle assembly can be reversed readily by merely loosening or removing the bolt assemblies 37 and reversing and reinserting the spindle assemblies.

As shown in FIG. 1, a driven motor 43, preferably a hydraulic motor, can be provided on either or both of the rollers by a bracket 44 pivoted to tabs 45 on the spindle assembly and supporting a drive roller 46 which is in engagement with the periphery of the welding wheel 14. The bracket 44 is yieldingly urged in a manner to bring the drive roller 46 into engagement with the periphery of the wheel 14 by a spring 47 interposed between an extension 48 on bracket 44 and a nut and washer 49 on a pin 50 pivoted to a second tab 51 on the head. Brackets 45 are clamped to spindle housing 22 any may be rotated to other positions.

Hydraulic motor 43 may also be clamped to upper spindle housing 22 to drive the upper weld wheel 14 if desired or an upper and lower motor can be applied.

Hydraulic motor 43 can be changed end for end and a drive chain and sprocket assembly applied to drive the spline shaft 23 directly.

Motors 43 can be used on both top and bottom heads 13.

Power is applied to the welder through a connection 53 in the form of a bracket mounted on arm 10 and interconnected by an electrical flexible shunt 53 to the arm 11.

In use, an operator grasps the handles 20, 21 of the portable seam welder which is suspended adjacent the work station by a loop 54, locates the welder in position, presses a trigger or button 55 to operate actuator 16 and bring the weld wheels 14 into position and energize the hydraulic motor 43 so that the welder will move along the parts to be formed. Trigger 55 also actuates the power source in a manner well known in the art to apply power so that the weld may be completed. At the completion of the seam, the trigger 55 is released interrupting the power to the rollers and causing the actuator to move the weld wheels away from one another.

I claim:
1. A portable seam welder comprising
 a pair of arms pivoted to one another about a pivot axis,
 a spindle assembly mounted on each arm,
 each spindle assembly including a housing, a shaft, and spaced radial and axial bearings electrically isolated from one of said housing and said shaft for rotatably mounting said shaft in said housing about an axis extending generally parallel to said pivot axis and perpendicular to the longitudinal axis of its respective arm,
 a weld wheel on each shaft,
 electrical collector ring contact means independent of said bearings for transmitting power between said housing and said shaft and in turn to said wheel,
 handle means on one of said arms for manipulating said welder,
 and actuator means operably connected to said arms for pivoting said arms relative to one another for moving said wheels toward and away from one another,
 and motor means mounted on said housing of said spindle assembly for applying power to one of said wheels.

2. The combination set forth in claim 1 wherein said last-mentioned means comprises a first set of annular electrical contact members movable with said shaft and a second set of annular electrical contact members generally fixed with respect to said housing,
 and means yieldingly urging said first and second contact members axially into engagement with one another.

3. The combination set forth in claim 1 wherein each said arm includes a head on which said spindle assembly is mounted,
 and means for mounting said head for angular movement on said arm about an axis forming an angle to the axis of the spindle assembly and extending in the direction of the longitudinal axis of said arm.

4. The combination set forth in claim 3 wherein said means for mounting said head comprises telescoping portions between said arm and said head having their axes extending in the direction of the axis of said arm and means for clamping said head in angularly adjusted position.

5. The combination set forth in claim 4 wherein said last-mentioned means comprises a slot in the periphery of the telescoping portion of said head and a removable shaft extending through said arm and said slot to block said head against angular movement such that the shape can be removed and the head rotated, another slot formed in the head and the shaft re-inserted to lock the head in another angular position.

6. The combination set forth in claim 1 wherein each said spindle assembly includes a housing and means on said arm for adjustably supporting said housing on said arm axially of said shaft.

7. The combination set forth in claim 6 wherein said last-mentioned means comprises means defining a portion of said arm into which said spindle housing is telescoped and means for clamping said spindle assembly into said portion.

8. The combination set forth in claim 1 including means for mounting each said spindle assembly for adjustment about the axis of the arm.

9. The combination set forth in claim 1 wherein said means for driving one of said weld wheels comprises a hydraulic motor.

10. The combination set forth in claim 1 wherein said handle means comprises a first handle grip handle on one of said arms and a second handle extending laterally from said arm.

11. The combination set forth in claim 1 including means on the other of said arms for driving the other of said drive weld wheels.

12. A portable seam welder comprising
 a pair of arms pivoted to one another about a pivot axis,
 a spindle assembly mounted on each arm,
 each spindle assembly including a housing including a shaft rotatably mounted in said housing about an axis extending generally parallel to the pivot axis and perpendicular to the longitudinal axis of its respective arm,
 a weld wheel on each shaft,
 motor means on at least one of said housings having driving engagement with the wheel on said housing for rotating one of said wheels,
 handle means on one of said arms for manipulating said welder,
 actuator means operably connected to said arms for pivoting said arms relative to one another for moving said weld wheels toward and away from one another, means for applying power to said wheels, a radial bearing and a spaced axial bearing electrically isolated from one of said housing and said shaft for rotatably mounting said shaft in said housing, and electrical contact means independent of said bearings for transmitting power between said housing and said shaft and in turn to said roller comprising a first set of annular electrical contact members movable with said shaft and a second set of annular electrical contact members generally fixed with respect to said housing, and means yieldingly urging said first and second contact members axially into engagement with one another.

13. The combination set forth in claim 12 wherein said means for mounting said head comprises telescoping portions between said arm and said head having their axes extending in the direction of the axis of said arm and means for clamping said head in angularly adjusted position.

14. The combination set forth in claim 13 wherein said last-mentioned means comprises a slot in the periphery of the telescoping portion of said head and a removable shaft extending through said arm and said slot to block said head against angular movement such that the shape can be removed and the head rotated, another slot formed in the head and the shaft re-inserted to lock the head in another angular position.

15. The combination set forth in claim 12 including motor means on the other of said arms having driving engagement with said other drive roller for driving the other of said drive rollers.

16. A portable seam welder comprising
a pair of arms pivoted to one another about a pivot axis,
a spindle assembly mounted on each arm,
each spindle assembly including a housing including a shaft rotatably mounted in said housing about an axis extending generally parallel to the pivot axis and perpendicular to the longitudinal axis of its respective arm,
a weld wheel on each shaft,
motor means on at least one of said housings having driving engagement with the wheel on said housing for rotating one of said wheels,
handle means on one of said arms for manipulating said welder,
actuator means operably connected to said arms for pivoting said arms relative to one another for moving said weld wheels toward and away from one another,
means for applying power to said wheels,
each said arm including a head on which said spindle assembly is mounted,
and means for mounting said head for angular movement on said arm about an axis forming an angle to the axis of the spindle assembly and extending in the direction of the longitudinal axis of said arm.

17. A portable seam welder comprising
a pair of arms pivoted to one another about a pivot axis,
a spindle assembly mounted on each arm,
each spindle assembly including a housing including a shaft rotatably mounted in said housing about an axis extending generally parallel to the pivot axis and perpendicular to the longitudinal axis of its respective arm,
a weld wheel on each shaft,
motor means on at least one of said housings having driving engagement with the wheel on said housing for rotating one of said wheels,
handle means on one of said arms for manipulating said welder,
actuator means operably connected to said arms for pivoting said arms relative to one another for moving said weld wheels toward and away from one another,
means for applying power to said wheels,
each said spindle assembly including a housing and means on said arm for adjustably supporting said housing on said arm axially of said shaft,
said last-mentioned means comprising means defining a portion of said arm into which said spindle housing is telescoped and means for clamping said spindle assembly into said portion.

* * * * *

UNITED STATES PATENT AND TRADEMARK OFFICE
CERTIFICATE OF CORRECTION

PATENT NO. : 4,100,391
DATED : July 11, 1978
INVENTOR(S) : William T. Wilbur

It is certified that error appears in the above-identified patent and that said Letters Patent are hereby corrected as shown below:

Column 5, line 28, delete "shape" and insert --shaft--

*Signed and Sealed this*

*Twenty-sixth* Day of *December 1978*

[SEAL]

*Attest:*

RUTH C. MASON
*Attesting Officer*

DONALD W. BANNER
*Commissioner of Patents and Trademarks*